(12) United States Patent
Lee et al.

(10) Patent No.: US 12,310,524 B2
(45) Date of Patent: May 27, 2025

(54) COFFEE EXTRACTION APPARATUS

(71) Applicant: LG Electronics Inc., Seoul (KR)

(72) Inventors: Wonkyu Lee, Seoul (KR); Jungwon Lee, Seoul (KR); Seoyoun Kim, Seoul (KR); Jongkwan Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 921 days.

(21) Appl. No.: 17/201,556

(22) Filed: Mar. 15, 2021

(65) Prior Publication Data

US 2021/0298515 A1 Sep. 30, 2021

(30) Foreign Application Priority Data

Mar. 25, 2020 (KR) .................. 10-2020-0036063

(51) Int. Cl.
| | |
|---|---|
| *A47J 31/053* | (2006.01) |
| *A47J 31/00* | (2006.01) |
| *A47J 31/057* | (2006.01) |
| *A47J 31/42* | (2006.01) |

(52) U.S. Cl.
CPC .......... *A47J 31/053* (2013.01); *A47J 31/002* (2013.01); *A47J 31/0573* (2013.01); *A47J 31/42* (2013.01)

(58) Field of Classification Search
CPC .... A47J 31/053; A47J 31/002; A47J 31/0573; A47J 31/42; A47J 31/22; A47J 31/20; A47J 31/0626
USPC ........................................................ 99/286
See application file for complete search history.

(56) References Cited

U.S. PATENT DOCUMENTS

| | | | |
|---|---|---|---|
| 2003/0061942 A1* | 4/2003 | Erickson | A23F 5/04 99/476 |
| 2007/0079708 A1 | 4/2007 | Li | |
| 2012/0183659 A1* | 7/2012 | Hulett | A47J 31/46 426/431 |

(Continued)

FOREIGN PATENT DOCUMENTS

| | | | |
|---|---|---|---|
| KR | 101673479 | 11/2016 | |
| KR | 101840568 B1 * | 11/2016 | ............... A47J 31/20 |

(Continued)

OTHER PUBLICATIONS

PCT International Search Report and Written Opinion in International Appln. No. PCT/KR2021/001546, dated May 28, 2021, 10 pages (with English translation).

*Primary Examiner* — Dana Ross
*Assistant Examiner* — Abigail H Rhue
(74) *Attorney, Agent, or Firm* — Fish & Richardson P.C.

(57) ABSTRACT

A coffee extraction apparatus includes: a grinder grinding whole beans into coffee powder having a preset size or less and discharging the coffee powder, a grinder inlet defined at a first side of the grinder to introduce the whole beans to the grinder, a grinder outlet defined at a second side of the grinder and discharging the coffee powder, and a first extractor. The first extractor includes: a receiver inlet that faces the grinder and that receives the discharged coffee powder, a filter part receiving the coffee powder through the receiver inlet and extracting coffee liquid by rotating the coffee powder with water of a first temperature, the first temperature being equal to or lower than 25 degrees Celsius, and a receiver that receives the water of the first temperature and that is configured to store the water of the first temperature or the extracted coffee liquid.

18 Claims, 5 Drawing Sheets

(56) References Cited

U.S. PATENT DOCUMENTS

| | | | | |
|---|---|---|---|---|
| 2014/0083301 A1* | 3/2014 | Nakao | ............... | A47J 31/44 99/295 |
| 2014/0124431 A1* | 5/2014 | Love | ............... | B01D 33/275 210/330 |
| 2017/0119195 A1* | 5/2017 | Al-Shaibani | ......... | A47J 31/404 |
| 2019/0328170 A1* | 10/2019 | Cai | ............... | A47J 31/407 |

FOREIGN PATENT DOCUMENTS

| | | |
|---|---|---|
| KR | 101840568 | 3/2018 |
| KR | 1020190084206 | 7/2019 |

* cited by examiner

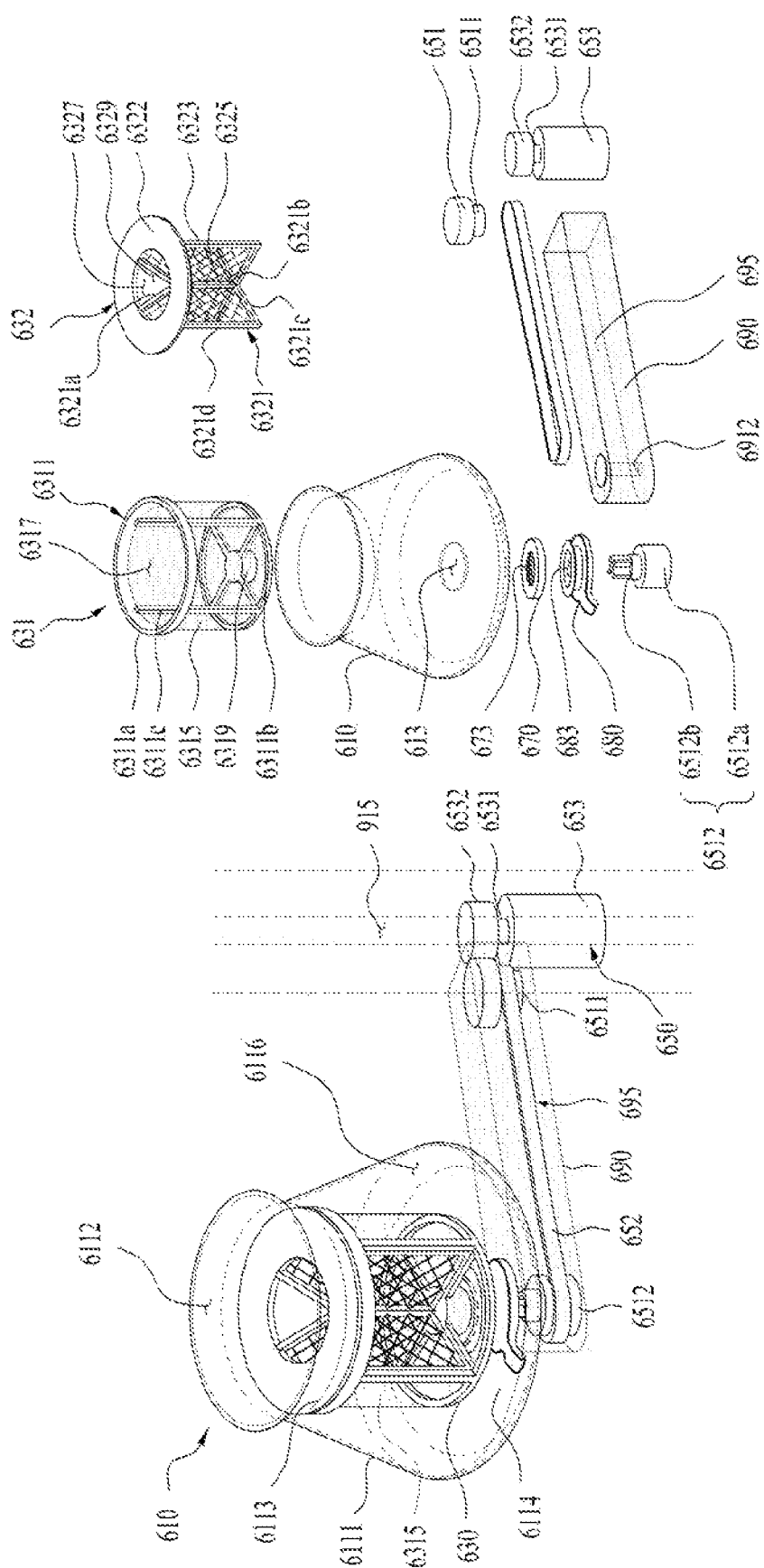

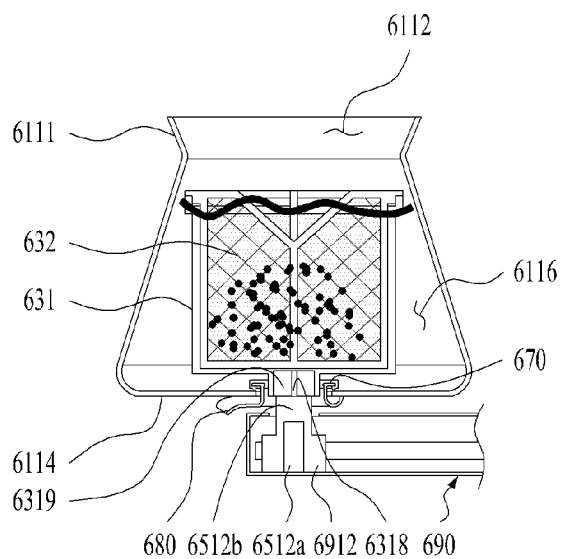
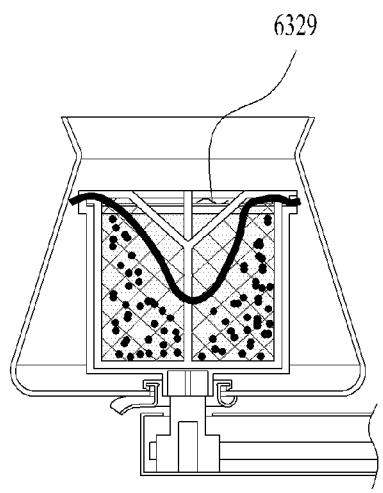
FIG. 3A
FIG. 3B
— Surface of water
• Coffee powder
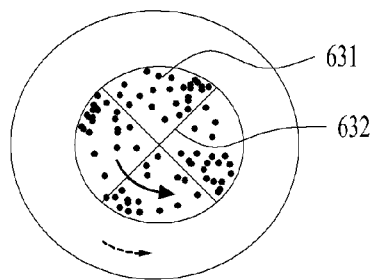
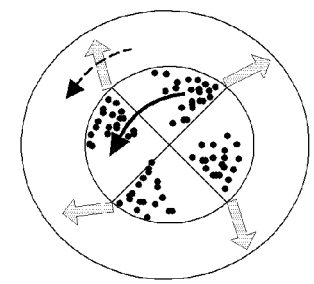
--→ Flow direction
—→ Rotational direction of the filter part
⇨ Centrifugal force
• Coffee powder
FIG. 3C
FIG. 3D

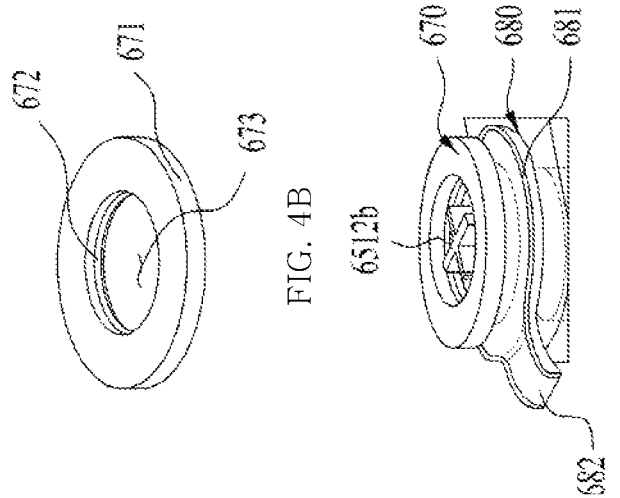
FIG. 4B
FIG. 4C
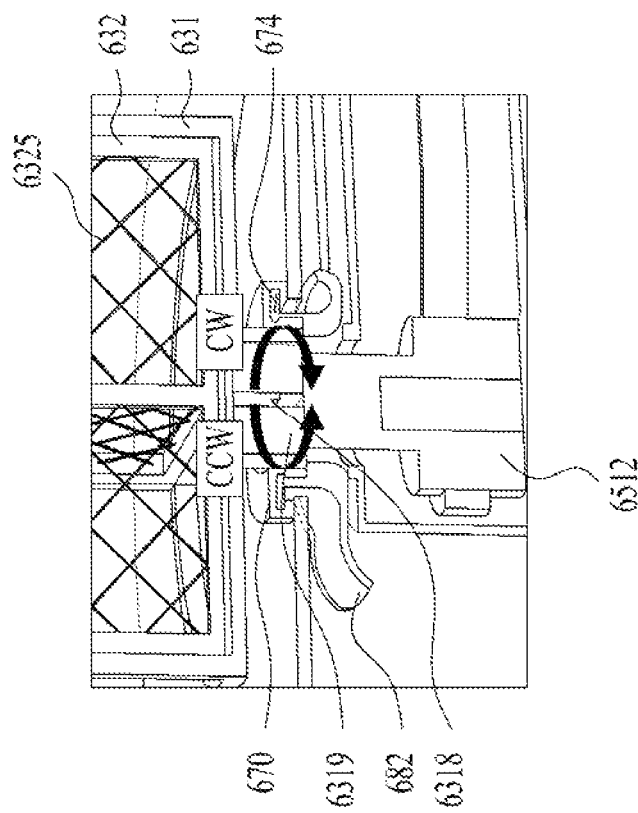
FIG. 4A

COFFEE EXTRACTION APPARATUS

CROSS-REFERENCE TO RELATED APPLICATION

This application claims the benefit of the earlier filing date and the right of priority to Korean Patent Application No. 10-2020-0036063, filed on Mar. 25, 2020, which is hereby incorporated by reference in its entirety.

TECHNICAL FIELD

The present disclosure relates to a coffee extraction apparatus, and relates to an apparatus for extracting coffee according to a cold brew method.

BACKGROUND

A method of extracting coffee liquid from whole beans includes extracting coffee liquid in a short time by pouring hot water onto ground whole beans. Another method of brewing ground whole beans in water having a temperature below room temperature for a long time and extracting coffee liquid has been introduced. These methods are referred to as a hot brew method and a cold brew method, respectively.

The hot brew method has the advantage of producing a rich taste and flavor because ground whole beans are immediately brewed with hot water. Compared to other methods, the hot brew method is relatively simple. For the cold brew method, water of room temperature is poured onto coffee powder, and the coffee powder is brewed slowly for a certain period of time and filtered. The cold brew method has the advantage of being mild and soft in taste because bitter and acidic tastes of coffee beans disappear while extraction is performed.

In recent years, people who want to enjoy drip coffee are increasing. However, there is a problem that it is difficult for individuals to maintain the freshness of purchased whole beans. Further, if a user purchases unground whole beans, the user should be equipped with a grinder and the taste of coffee changes each time coffee liquid is extracted because a dripping method is difficult. Moreover, all these processes are long and complicated, which is an obstacle for individuals to enjoy the drip coffee.

In order to partially solve this problem, devices that implement the drip method have emerged. However, the user should manually put ground whole bean coffee powder into a drip device. In addition, it is difficult to maintain the freshness of ground coffee beans.

Further, in order to conveniently enjoy cold brew coffee, there is a problem in that a user should purchase a cold brew machine separately from a hot brew machine.

Recently, several devices have been developed to solve a slow extraction speed, which is a disadvantage of the cold brew method.

Coffee can be extracted using various methods. For example, coffee can be extracted by repeatedly circulating water and coffee powder contained in a space between upper and lower filters. Coffee is extracted only by repeated contact of water with the coffee powder. However, the taste of the extracted coffee may not be uniform because contact between the coffee powder and water may not be evenly maintained. Since coffee is extracted only by simple contact, there is a problem in that it is difficult to remarkably shorten an extraction speed.

Coffee can also be extracted by using rotation of a filter basket containing coffee powder. This method uses an effect of increasing contact between coffee powder and water by generating a vortex in water through simple rotation of the filter basket and while having a limit to increase extraction speed.

The coffee can also be extracted by using sound waves. The coffee is extracted from powder by applying a low-frequency sound wave affecting up to molecule to the mixture of whole bean powder and water. This method is inconvenient in that leached coffee should be shaken at a low frequency and then coffee liquid should be separately filtered.

Coffee can also be extracted by a quick circulation method using pressure. In this method, coffee powder is placed in a container having a filter therein and water is continuously injected through a water pump from the bottom. If water reaches a certain pressure, coffee liquid extracted through a pressure release valve in an upper cover is discharged. However, in this method, sealing of the upper cover with a pressure valve is important and this sealing should be done manually. In addition, there is a high possibility that contaminants such as coffee grounds may be accumulated in an internal narrow path and a gap because extracted coffee liquid is repeatedly circulated through the entire internal path.

SUMMARY

The present disclosure is directed to a coffee extraction apparatus.

The coffee extraction apparatus can be configured to simultaneously apply pressure caused by stirring and pressure caused by centrifugal force using a filter of a water turbine type when coffee powder and water are mixed to enable quick coffee extraction using a cold brew method.

The coffee extraction apparatus can be further configured to discharge extracted coffee liquid according to a rotation direction without a separate driving unit.

The coffee extraction apparatus can be further configured to adjust the amount of water which is stirred and the concentration of coffee extraction by discharging coffee liquid to the outside according to a rotation direction.

The coffee extraction apparatus can be further configured to interchangeably use extractors according to a hot brew method and a cold brew method.

The coffee extraction apparatus can substantially increase user convenience through the above-described features.

The coffee extraction apparatus can include a filter part in which coffee powder is received is designed to have a dual structure of an outer filter and an inner filter and coffee liquid is extracted using stirring and centrifugal force of water and coffee powder during rotation by providing the inner filter of a water turbine type.

According to one aspect of the subject matter described in this application, a coffee extraction apparatus includes a grinder that is configured to grind whole beans into coffee powder having a preset size or less and that is configured to discharge the coffee powder, a grinder inlet defined at a first side of the grinder to introduce the whole beans to the grinder, a grinder outlet that is defined at a second side of the grinder opposite to the first side of the grinder and that is configured to discharge the coffee powder, and a first extractor. The first extractor can include a receiver inlet that faces the grinder and that is configured to receive the discharged coffee powder, a filter part that is configured to receive the coffee powder through the receiver inlet and that is configured to extract coffee liquid by rotating the coffee powder with water of a first temperature, the first temperature being equal to or lower than 25 degrees Celsius, and a receiver that is configured to receive the water of the first temperature and that is configured to store the water of the first temperature or the extracted coffee liquid. The coffee extraction apparatus can further include a driver that is coupled to the filter part and that is configured to rotate the filter part, a supporter that is disposed outside the grinder and the first extractor and that supports the grinder and the first extractor, and a water supplier configured to supply the water of the first temperature to the first extractor through the receiver inlet.

Implementations according to this aspect can include one or more of the following features. For example, the coffee extraction apparatus of can further include a second extractor that faces the grinder outlet and that is configured to receive the coffee powder and water of a second temperature that is higher than the first temperature. The water supplier can be configured to supply the water of the second temperature to the second extractor, and one of the first extractor or the second extractor can be interchangeably coupled to the supporter.

In some implementations, the first extractor can further include a support arm supporting the receiver and the driver by coupling the receiver to the supporter. In some examples, the receiver can includes a receiving body that defines a space for receiving the coffee powder and the water, a receiving body bottom surface that defines a bottom surface of the receiving body, and a first through-hole having a circular shape and defined at the receiving body bottom surface.

In some implementations, the filter part can include a first filter detachably coupled to the driver, and a second filter detachably coupled to an inner portion of the first filter and configured to rotate with the first filter. In some implementations, the coffee extraction apparatus can further include a driving motor disposed inside the supporter, where the driver includes a first pulley configured to rotate based on rotation of the driving motor, a second pulley configured to rotate the filter part, and a belt that connects the first pulley to the second pulley and that is configured to transfer rotational force of the driving motor to the first pulley and the second pulley.

In some examples, the second pulley can include a belt connector that is in contact with the belt and that is configured to rotate with the belt, and a filter rotating shaft that is disposed at an upper portion of the belt connector, that is configured to rotate with the belt connector, that is inserted into the receiving body through the first through-hole, and that is detachably coupled to the filter part. In some examples, the receiver can include a sealing part that is inserted into the first through-hole and that is configured to open and close the first through-hole, a second through-hole defined in the sealing part in a first direction corresponding to a height direction of the receiver, and a discharger that is coupled to a bottom surface of the sealing part and that is configured to guide the coffee liquid discharged through the first through-hole. The sealing part can be configured to move in the first direction based on the rotation of the filter part to open and close the first through-hole.

In some examples, the sealing part can include a main body including a sealing body inner circumferential surface that defines the second through-hole, a screw protrusion provided on the sealing body inner circumferential surface, and a sealing body outer circumferential surface located in a direction away from the second through-hole, a first extension body extended outwards, from an end of the sealing body, in a second direction corresponding to a radial direction of the sealing body, a second extension body that is angled from the first extension body and that extends towards the receiving body bottom surface in the first direction, a first coupling groove defined by the first extension body, the second extension body, and an outer circumferential surface of the main body, and a sealing protrusion having a circular shape and protruding downward from the second extension body. The sealing protrusion can be configured to move in the first direction during rotation of the filter part to open and close the sealing part.

In some implementations, the filter part can include a first filter detachably coupled to the driver, a second filter that is detachably coupled to an inner portion of the first filter and that is configured to rotate with the first filter, and a filter coupler that is disposed at a lower portion of the first filter and that is detachably coupled to the filter rotating shaft. The filter coupler can be inserted into the second through-hole and contacts the screw protrusion. In some examples, based on the first filter rotating in a first rotational direction, (i) the water or the coffee liquid received in the receiver can rotate in the first rotational direction and (ii) the screw protrusion can configured to rotate in the first rotational direction. The sealing part can configured to move downward based on the screw protrusion rotating in the first rotational direction, and the sealing protrusion and the receiving body bottom surface can be configured to contact each other.

In some examples, the screw protrusion can be configured to, based on the filter part rotating in a second rotational direction corresponding to a direction opposite to the first rotational direction, rotate in the second rotational direction. Based on the screw protrusion rotating in the second rotational direction, (i) the sealing part can be configured to move upward and (ii) the sealing protrusion and the receiving body bottom surface can be configured to be separated to open the first through-hole.

In some implementations, the coffee extraction apparatus can further include a coffee server configured to receive the extracted coffee liquid. The discharger can further includes a first discharge passage defined at a lower portion of the receiver and including a first wall that has a circular shape and that defines a third through-hole and a channel having one opened surface, and a second discharge passage coupled to the first discharge passage and configured to guide coffee liquid flowing along the first discharge passage to the coffee server. In some examples, the discharger can further include a first extension wall extending from the first wall, and a second extension wall angled from the first extension wall. The discharger can be configured to, based on the second extension wall being coupled to the first coupling groove and the sealing part moving in the first direction, move with the sealing part.

In some implementations, the filter part can include a first filter detachably coupled to the driver, and a second filter detachably coupled to an inner portion of the first filter and configured to rotate with the first filter. In some examples, the first filter can include a first filter body that has a cylindrical shape and that includes a first opening at an upper portion to define a space for receiving the coffee powder. The first filter body can include a first mesh defining an outer circumferential surface and a bottom surface of the first filter body, and the first mesh can have a size capable of passing only the water of the first temperature and coffee liquid.

In some examples, the second filter can include a plurality of filter blades each including a second filter body, and a second filter upper body that is coupled to an upper portion of the second filter body, that is detachably coupled to the first filter, and that defines a second opening providing communication to the first opening. A diameter of the second opening can be shorter than a diameter of the first opening. In some examples, each of the plurality of filter blades can include a second mesh, and the second mesh can have a size capable of passing the coffee powder.

In some implementations, each of the plurality of filter blades can further include a first frame inclined downward in a center direction of the first filter from an inner circumferential surface of the second opening, and a space of an inverted conical shape can be provided below the second opening based on rotation of the second filter. In some examples, the water received in the receiver can flow in a rotational direction of the first filter and the second filter based on rotation of the first filter and the second filter.

BRIEF DESCRIPTION OF THE DRAWINGS

FIG. 2A is a diagram illustrating a first extractor included in the exemplary coffee extraction apparatus.

FIG. 2B is a diagram illustrating an exploded view of the first extractor.

FIGS. 3A to 3D are diagrams illustrating exemplary shapes of a water surface during the beginning of rotation and after stabilization of a rotational speed of a first filter and a second filter, distribution of coffee powder, and force applied to coffee powder.

FIG. 4A is a diagram illustrating an example in which a filter part, a sealing part, and a discharger are coupled.

FIG. 4B is a diagram illustrating an exemplary sealing part.

FIG. 4C is a diagram illustrating an exemplary discharger.

DETAILED DESCRIPTION

A coffee extraction apparatus may refer to an apparatus for mixing ground whole beans, i.e., coffee powder, with water, dissolving coffee ingredients in water, and then extracting coffee liquid. The coffee liquid may refer to water containing coffee ingredients extracted from coffee powder using water. Therefore, the extracted coffee liquid may indicate that water containing coffee ingredients extracted from coffee powder is prepared using water.

In general, it takes a long time to extract coffee using a cold brew method. Therefore, various methods have been used to shorten a coffee extraction time. To this end, a coffee extraction apparatus can be configured to use centrifugal force to extract coffee ingredients while stirring water and coffee powder by rotating a filter having a water turbine type.

Figure 1:
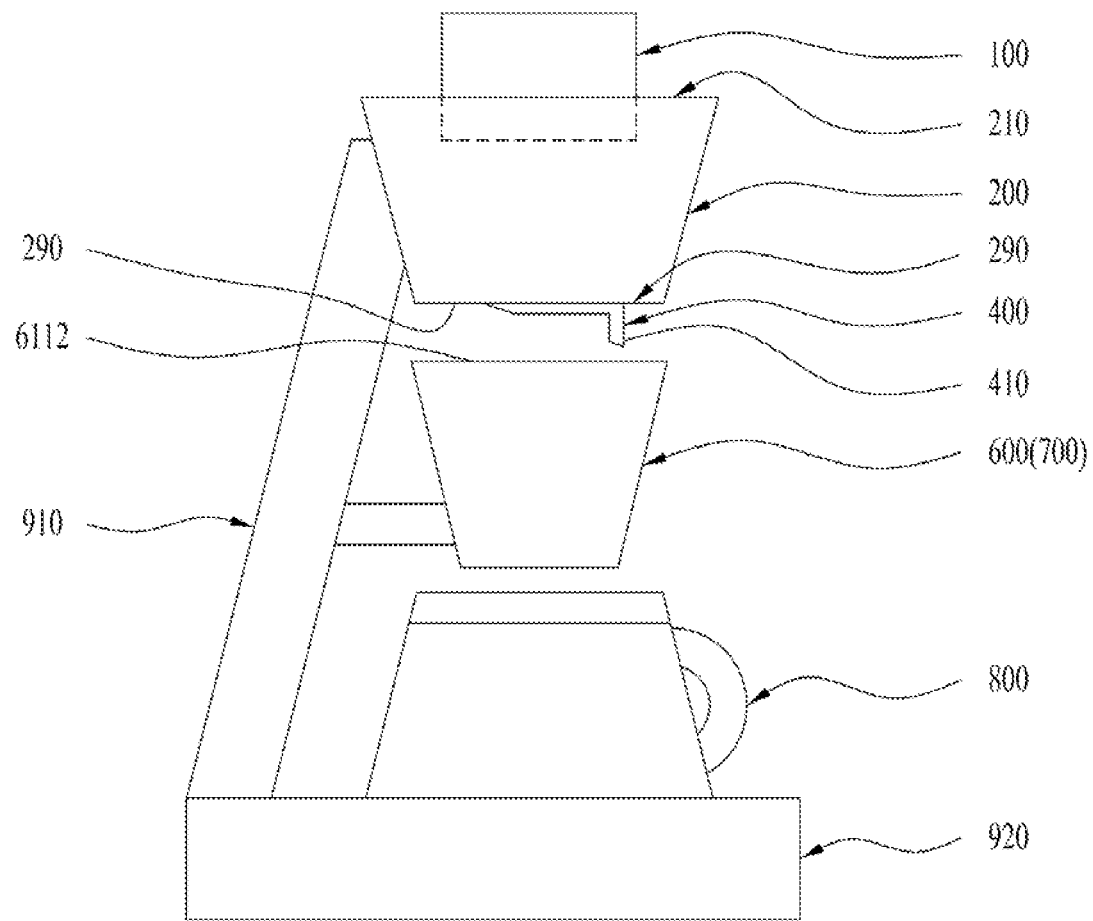
FIG. 1 is a diagram illustrating an exemplary coffee extraction apparatus.

FIG. 1 is a diagram illustrating a coffee extraction apparatus 1000. FIG. 2A is a diagram illustrating an exemplary first extractor 600. FIG. 2B is a diagram illustrating an exploded view of the first extractor 600. Referring to FIGS. 1 and 2A-B, the coffee extraction apparatus 1000 can include a grinder 200 for grinding whole beans into coffee powder having a preset size or less and supplying the coffee powder, a grinder inlet 210 located at one side of the grinder 200, for introducing the whole beans, a grinder outlet 290 located at the other side of the grinder 200, which is an opposite direction of the one side of the grinder 200, for discharging the coffee powder, a first extractor 600, a driving unit 650 coupled to a filter part 630, for rotating the filter part 630, a supporter 910 located outside the grinder 200 and the first extractor 600, for supporting the grinder 200 and the first extractor 600, and a water supplier 400 for supplying water of a first temperature to the first extractor 600 through a receiver inlet 6112. The first extractor 600 can include the receiver inlet 6112 located to face the grinder outlet 290, for introducing the discharged coffee powder thereinto, the filter part 630 for receiving the coffee powder through the receiver inlet 6112 and extracting coffee liquid by rotating the coffee powder with water of the first temperature, which is a temperature equal to or lower than room temperature, and a receiver 610 for receiving water of the first temperature and storing water of the first temperature or the coffee liquid extracted through the filter part 630.

The coffee extraction apparatus 1000 can further include a whole bean supplier 100 for supplying whole beans to the grinder 200 and a base 920 for supporting the supporter 910. A controller can be included in the base 920.

The whole bean supplier 100 can be provided in the form of a dispenser that stores the whole beans of an amount usable several times and supplies the whole beans to the grinder 200. In some implementations, the whole bean supplier 100 can be provided in the form of a disposable whole bean storage capsule that stores enough whole beans to be consumed once. For example, if the whole bean storage capsule is coupled to the whole bean supplier 100, the whole bean storage capsule can be opened and then the whole beans can be dropped into the grinder 200.

The whole beans supplied from the whole bean supplier 100 can be introduced through the grinder inlet 210 located at one side of the grinder 200 and then discharged through the grinder outlet 290 located at the other side of the grinder 200 after being grounded into coffee powder.

The coffee powder discharged through the grinder outlet 290 can be received in the first extractor 600 or a second extractor 700 through the receiver inlet 6112 facing the grinder outlet 290.

In some implementations, the whole beans can be dropped from the whole bean supplier 100 using gravity. The dropped beans can be grounded in the grinder 200 into coffee powder having a preset size or less and can be received in the filter part 630 provided inside the first extractor 600.

The grinder 200 can grind the supplied whole beans into coffee powder having a preset size or less. Since a grinding degree and an extracted degree may be different depending on a coffee type, the grinding degree can be differently set in the grinder 200 according to user's selection or the coffee type. This is because taste may vary according to the grinding degree, a roasted degree, and the temperature of water.

The grinding degree of the whole beans may refer to a surface area capable of contacting water. Therefore, finely ground whole beans can have a larger surface area and it can be easier to extract compounds in the finely ground whole beans.

The grinder 200 can use a conical burr to reduce impact when the whole beans are grounded and to improve user's convenience for cleaning the grinder at home. The grinder 200 can cause an external burr, among an internal burr and the external burr of the conical burr, to rotate thereby preventing the driving unit from being located in an area into which coffee powder falls.

To this end, a coffee extraction apparatus 1000 can include: a grinder 200 configured to grind whole beans into coffee powder having a preset size or less and supply the coffee powder; a grinder inlet 210 located at one side of the grinder 200 and configured to introduce the whole beans; a grinder outlet 290 located at the other side of the grinder 200 corresponding to an opposite direction of the one side of the grinder 200 and configured to discharge the coffee powder; a first extractor 600 including (i) a receiver inlet 6112 located to face the grinder outlet 290 and configured to introduce the discharged coffee powder, (ii) a filter part 630 configured to receive the coffee powder through the receiver inlet 6112 and extract coffee liquid by rotating the coffee powder with water of a first temperature corresponding to a temperature equal to or less than room temperature, and (iii) a receiver 610 configured to receive water of the first temperature and store water of the first temperature or the coffee liquid extracted through the filter part 630; a driving unit 650 coupled to the filter part 630 and configured to rotate the filter part 630; a supporter 910 located outside the grinder 200 and the first extractor 600 and configured to support the grinder 200 and the first extractor 600; and a water supplier configured to supply water of the first temperature to the first extractor through the receiver inlet.

The coffee extraction apparatus can further include a second extractor located to face the grinder outlet and configured to receive the coffee powder and water of a second temperature higher than the first temperature. The water supplier can supply water of the second temperature to the second extractor. One of the first extractor and the second extractor can be interchangeably coupled to the supporter.

The first extractor 600 can include the filter part 630 for receiving coffee powder discharged from the grinder 200 and the receiver 610 into which the filter part 630 is inserted. The filter part 630 can extract coffee liquid by rotating the coffee powder and water of the first temperature.

The receiver 610 can store the coffee liquid extracted through the filter part 630 or the water of the first temperature. The filter part 630 can be made of a mesh material so that water or coffee liquid is capable of freely passing therethrough, whereas solid coffee powder may not pass therethrough. Therefore, when the filter part 630 rotates, coffee powder, water, and coffee liquid can rotate inside the filter part 630 and water and coffee liquid can rotate in a space between the outside of the filter part 630 and the receiver 610.

A coffee server 800 that can store the extracted coffee liquid can be provided under the first extractor 600. The coffee server 800 can be a pot of a kettle type or can have a cup type that is generally used. The coffee server 800 may be disposed under the first extractor 600 can store dropping coffee liquid that is immediately discharged from the first extractor 600 or store coffee liquid by moving the coffee liquid to another location using a discharger that guides the coffee liquid to the outside.

Since the first extractor 600 uses the water of the first temperature, the first extractor 600 can be used when a cold brew method is used. When water having a second temperature higher than the first temperature is used, the second extractor 700 having a structure different from the first extractor 600 can be used. In some implementations, the first extractor 600 and the second extractor 700 can have the same structure coupled to the supporter 910 and can be interchangeable. Accordingly, the user may select the first extractor 600 or the second extractor 700 according to a desired extraction method. The water of the first temperature or the water of the second temperature can be supplied through the water supplier 400.

The water supplier 400 can supply the water of the first temperature or the water of the second temperature to the first extractor 600 or the second extractor 700 using a water supply nozzle 410. The water supplier 400 can receive the water of the first temperature or the water of the second temperature from an external water supply source. In some implementations, the water supplier 400 can receive the water of the first temperature through the external water supply source, heat the water using a heater, and then supply the heated water to the second extractor 700.

In some implementations, the water supplier 400 can store water in a water supply tank and the stored water can be supplied through a water supply pipe connected to the water supply tank.

The first extractor 600 and the second extractor 700 can be fixed to the supporter 910 by support arms 690 included respectively in the first extractor 600 and the second extractor 700. The support arms 690 can have the same coupling portion to the supporter 910 and can be interchangeably mounted in the supporter 910. The first extractor 600 and the second extractor 700 can occupy the same space and can have a similar shape in outer appearance.

The base 920 can be obliquely or vertically coupled to the support 910. The base 920 can fix the supporter 910 and can support load applied to the supporter 910. For example, the whole bean supplier 100, the grinder 200, the water supplier 400, and the first extractor 600 can be directly or indirectly coupled to the supporter 910, thereby causing an eccentric load. Accordingly, bending moment, shear force, and torsion can be applied to the support 910. The base 920 can serve to fix and support the supporter 910 so as to endure the bending moment, shear force, and torsion. In some implementations, a controller for controlling the coffee extraction apparatus 1000 can be included inside the base 920. The controller can control motors used for the grinder 200, the whole bean supplier 100, the first extractor 600, and the water supplier 400 and control the amount of water supplied by the water supplier 400 and opening/closing of the discharger 680.

Referring to FIG. 2A, the first extractor 600 can be located under the grinder 200 to receive ground whole beans (i.e., coffee powder), mix the coffee powder with water, and extract coffee liquid. For example, the first extractor 600 can use water of the first temperature having a temperature equal to or lower than room temperature to extract coffee liquid by using the cold brew method. The first extractor 600 can include the receiver 610 and the filter part 630.

The filter part 630 can be provided inside the receiver 610. The filter part 630 can receive coffee powder that has been grounded and dropped through the grinder 200. The coffee powder can be mixed with supplied water and stirred through rotation of the filter part 630 to extract coffee liquid. The filter part 630 can only pass water or extracted coffee liquid and may not pass coffee powder. Accordingly, coffee powder cannot be moved to the receiver 610 by the filter part 630. For example, most of the outer appearance of the filter part 630 can be made of a mesh-type material, thereby performing a filtering function.

The receiver 610 can provide a space for storing extracted coffee liquid or water. Water of the first temperature (hereinafter, the water of the first temperature is simply referred to as water unless specified otherwise) supplied through the water supplier 400 can be supplied to the receiver 610 or the filter part 630. The water supplied through the receiver 610 can pass through the outer circumferential surface of the filter part 630 and enter the inside of the filter part 630. In some implementations, the coffee liquid extracted from the inside of the filter part 630 can also pass through the outer circumferential surface of the filter part 630 and enter the inside of the receiver 610. For example, the coffee liquid and water can be freely moved between the receiver 610 and the filter part 630. By way of further example, if water supplied from the water supplier 400 is supplied to the filter part 630 instead of the receiver 610, water may flow to the receiver 610.

The receiver 610 can include a receiver inlet 6112 into which coffee powder discharged from the grinder outlet 290 is introduced, a receiving body 6111 defining an outer shape of the receiver 610 and defining a receiving space 6116 in which water, coffee liquid, and the filter part 630 are received, a receiving body bottom surface 6114 defining a bottom surface of the receiving body 6111, and a first through-hole 613 located on the receiving body bottom surface and through which the receiving body bottom surface 6114 can be penetrated in the first direction.

The receiver inlet 6112 can be an opened portion of the receiving body 6111 (i.e., a receiving body opening) to provide fluid communication to the receiving space 6116.

For example, as illustrated in FIG. 2A, a cross-section of the receiver 610 is decreased and then increased again from the receiving body opening 6112 to a bottom surface of the receiver 610 in a first longitudinal direction. The receiver 610 can further include a receiving body concave 6113 located at a point at which a cross-section size of the receiver 610 is changed from decreased to increased.

The height of the receiving body concave 6113 can be higher than the height of the filter part 630, i.e., a height in a state in which the first filter 631 and the second filter 632 are combined. This serves to cause the filter part 630 to be completely immersed in water. Further, the size of the receiving body concave 6113 can have the smallest cross-section among cross-sections of the receiving body 6111. In some implementations, the size of the receiving body concave 6113 can be larger than a cross-section of the filter part 630 so that the filter part 630 can be inserted into or separated from the receiving space 6116.

The receiving body 6111 can be made of a transparent material such as glass. The transparent material can enable the user to check the current state of the receiving space 6116 from the outside.

The receiving body bottom surface 6114 can include the first through-hole 613 through which the receiving body bottom surface 6114 can be penetrated in the first direction. This serves to couple the filter part 630 and the driving unit 650 through the first through-hole 613. The filter part 630 can be coupled to a sealing part 670 to limit leakage into the first through-hole 613 while being rotated.

The filter part 630 can be inserted into the receiving space 6116 and can be rotatably coupled to the driving unit 650 through the first through-hole 613. The coupling to the driving unit 650 can be detachable and the filter part 630 can be separated from the driving unit 650.

Referring to FIG. 2B, the filter part 630, the sealing part 670, the discharger 680, and the driving unit 650 can be coupled using the first through-hole 613. The filter part 630 can include a first filter 631 having a cylindrical shape and a second filter 632 including a plurality of filter blades 6323. A second filter upper body 6322 can be coupled to a first filter upper frame 6311a of the first filter 631 so that the second filter 632 can rotate together with the first filter 631.

In some implementations, a protrusion can be provided at a lower portion of the second filter 632, i.e., at a portion at which the plurality of filter blades 6323 meet, so that the protrusion is coupled to an upper portion of a filter coupler 6319 of the first filter 631 and the first filter 631 and the second filter 632 can rotate together.

A first filter coupling groove 6318 (see FIG. 4A) can be provided at a lower portion of the filter coupler 6319, and the first filter coupling groove 6318 and a filter rotating shaft 6512b of the driving unit 650 can be coupled. Through this coupling, the controller can rotate the first filter 631.

The sealing part 670 defines a second through-hole 673 in the first direction, and the discharger 680 defines a third through-hole 683 in the first direction. For example, the sealing part 670 can be a sealing part ring having a torus or donut shape. Therefore, when the sealing part 670 is inserted into the first through-hole 613 and the discharger 680 is coupled to the sealing part 670, the second through-hole 673 and the third through-hole 683 can communicate with each other. For example, a part of the sealing part 670 and a part of the discharger 680 can be inserted into the second through-hole 673. Most of the sealing part 670 can be located above the first through-hole 613 and most of the discharger 680 can be located below the first through-hole 613.

The sealing part 670 and the discharger 680 can be inserted into the first through-hole 613, and the receiving space 6116, the second through-hole 673, and the third through-hole 683 can have a structure that can communicate with each other. For example, the filter coupler 6319 can be inserted into the second through-hole 673, and the filter rotating shaft 6512b provided in the driving unit 650 can be inserted into the third through-hole 683. By way of further example, the filter coupler 6319 and the filter rotating shaft 6512b can be coupled to each other within the second through-hole 673 and the third through-hole 683. Further, when the driving unit 650 is not operating, the filter coupler 6319 can be separated from the filter rotating shaft 6512b. For example, the filter coupler 6319 can be detachable from the filter rotating shaft 6512b.

When the filter coupler 6319 is coupled to the filter rotating shaft 6512b, the second through-hole 673 and the third through-hole 683 can be closed so that leakage can be limited. For example, when the filter rotating shaft 6512b rotates, the filter coupler 6319 can also rotate in the second through-hole 673 and the third through-hole 683. By way of further example, an outer circumferential surface of the filter coupler 6319 can contact a screw protrusion 672 (see FIG. 4B) provided on an inner circumferential surface of the second through-hole 673 to limit leakage.

The driving unit 650 can be coupled to the filter part 630 to rotate the filter part 630. A first installation space 915 defined inside the supporter 910 can be provided with a driving motor 653, a driving motor rotating shaft 6531 rotated by the driving motor 653, and a driving gear 6532 coupled to a rotating shaft of the driving motor 653. When the driving unit 650 is coupled to the filter part 630, rotational force of the driving motor 653 can be transferred to the filter part 630.

The driving unit 650 can include a first gear 651 rotating in engagement with the driving gear 6532, a first pulley 6511 coupled to the first gear 651, and a second pulley 6512 connected to the first pulley 6511 by a belt 652. The second pulley 6512 can include a belt connector 6512a that rotates in contact with the belt 652 and the filter rotating shaft 6512b coupled to the belt connector 1512a to rotate in the same manner as the belt connector 6512a.

Therefore, the number of rotations of the driving motor 653 can be determined by a gear ratio according to the number of teeth of each of the driving gear 6532 and the first gear 651, and the number of rotations of the filter rotating shaft 6512*b* can be determined by a pulley ratio according to the size of a diameter of each of the first pulley 6511 and the second pulley 6512.

The first pulley 6511, the belt 652, and the second pulley 6512 can be installed in a second installation space 695 defined inside the support arm 690. Therefore, that the first extractor 600 is separated from the supporter 910 can indicate that all of the support arm 690 except for the driving motor 653, the driving motor rotating shaft 6531, and the driving gear 6532 installed in the first installation space 915 can be separated. Accordingly, the driving unit 650, in particular, the first gear 651 engaged with the driving gear 6532 can be separated from the driving gear 6532 when the first extractor 600 is separated.

A second pulley support shaft 6912 for supporting the second pulley 6512 in a direction away from the supporter 910 can be included in the second installation space 695. The second pulley 6512 can be fixed to be rotated by the second pulley support shaft 6912 to transfer rotational force to the filter part 630.

FIG. 2B is a diagram illustrating an example of the first filter 631 and the second filter 632. The filter part 630 can include the first filter 631 of a cylindrical shape and the second filter 632 including the plurality of filter blades 6323. The second filter upper body 6322 can be coupled to the first filter upper frame 6311*a* of the first filter 631 so that the second filter 632 can rotate together with the first filter 631.

The first filter 631 can have a cylindrical shape and define a first opening 6317 at an upper part thereof. The first filter 631 can receive coffee powder falling into the first filter 631 through the first opening 6317.

An outer circumferential surface and a bottom surface of the first filter 631 can include a first mesh 6315 having a mesh shape and a first filter body 6311 provided in such a manner that the first mesh 6315 maintains a cylindrical shape. The first filter body 6311 can be composed of only a kind of frame to form only a cylindrical skeleton. The first filter body 6311 can include the first filter upper frame 6311*a* defining an upper portion of the cylindrical shape, a first filter lower frame 6311*b* defining a bottom surface of the cylindrical shape, and a plurality of first frame side frames 6113*c* that connects the first filter upper frame 6311*a* to the first filter lower frame 6311*b* in the first direction so that the first mesh 6315 can define the outer circumferential surface of the first filter body 6311. If the cylindrical shape is provided by the first filter body 6311, the remaining portions except for the first opening 6317 (i.e., the outer circumferential surface and the bottom surface of the first filter body 6311) can be formed by the first mesh 6315. The first filter side frames 6311*c* can be provided in plural.

The first mesh 6315 may refer to a member having a mesh shape, i.e., a material consisting of a mesh such as a net shape. The first mesh 6315 can have a size to block coffee powder, which is solid, while passing coffee liquid and water, which are liquid. Accordingly, when the filter part 630 rotates, coffee powder can be blocked from escaping to the outside (e.g., a space between the filter part 630 and the receiver 610) due to centrifugal force. In some implementations, the material of the first mesh 6315 can be a fabric or a metal material.

The second filter 632 can include a plurality of filter blades that defines a second opening 6327 on an upper portion of the second filter 632. The second opening 6327 can communicate with the first opening 6317. The diameter of the second opening 6327 can be smaller than the diameter of the first opening 6317. This serves to limit coffee powder from scattering as much as possible by collecting the coffee powder in a central direction of the first filter 631.

Accordingly, coffee powder dropped from the grinder 200 can enter the first filter 631 through the second opening 6327. The second filter upper body 6322 can be provided in an area equal to the difference in size between the second opening 6327 and the first opening 6317 to serve as a cover of the first opening 6317. For example, the second filter upper body 6322 can include the second opening 6327 in the first direction, and the second filter upper body 6322 can be coupled to the first opening 6317.

In some implementations, the coffee powder can pass through the receiver inlet 6112 and can enter the first filter 631 through the second opening 6327. When the first filter 631 rotates due to coupling of the second filter upper body 6322 and the first opening 6317, the second filter 632 can also rotate. In some implementations, the first filter 631 and the second filter 632 can be separated. For example, the second filter 632 can be detachable from the first filter 631.

Each of the plurality of filter blades 6323 can include a first frame 6321*a* provided to be inclined towards the center in a radial direction of the second filter 632 on an inner circumferential surface of the second opening 627, a second frame 6321*b* extending from an end of the first frame 6321*a* to a bottom surface of the first filter 631 to be inserted into the first filter 631, a third frame 6321*c* extending from an end of the second frame 6321*b* to an outer side of the second filter 632 in a radial direction of the second filter 632, and a fourth frame 6321*d* extending from an end of the third frame 6321*c* to the second filter upper body 6322. Accordingly, the second frame 6321*b* and the fourth frame 6321*d* can be arranged in parallel in the first direction, and the third frame 6321*c* can be arranged in parallel with the bottom surface of the first filter 631. Since the first frame 6321*a* is connected to the end of the second frame 6321*b* and an inner circumferential surface of the second filter upper body 6322, the filter blades 8323 can have a trapezoidal shape in which one side is inclined.

In some implementations, due to the inclined first frame 6321*a*, when the plurality of filter blades 6323 is coupled to the second filter upper body 6322, a V-shaped space with a V-shaped cross-section can be defined at a lower portion of the second opening 6327. A space 6329 of an inverted conical shape can be defined by an optical illusion when the second filter 632 rotates at high speed. The second frame 6321*b* can be inclined to limit coffee powder dropped from the grinder 200 from unexpectedly falling outside of the first extractor 600 or the filter part 630 or being accumulated on the first frame 6321*a*, when the coffee powder dropped from the grinder 200 bounces off by the second frame 6321*b*.

Each filter blade 6323 can include a second filter body 6321 formed by the first frame 6321*a* to the fourth frame 6321*d*, and a second mesh 6325 of a mesh type provided inside the second filter body 6321.

The second mesh 6325 may refer to a member having a mesh shape, i.e., a material consisting of a mesh such as a net shape. The second mesh 6325 can have a size to freely pass solid coffee powder. For example, when the first filter 631 and the second filter 632 rotate, coffee powder can freely pass through the filter blades 6323 and can be moved within the first filter 631 when the second filter 632 rotates.

In some implementations, the second mesh 6325 can have a size capable of freely passing about 2 to 3 coffee powders. The material of the second mesh 6325 can be a fabric or a metal material.

For example, the first filter 631 can serve as a filter for extracting coffee liquid, whereas the second filter 632 can serve as a stirrer for stirring water and coffee powder.

For the cold brew method, it is necessary to sufficiently stir coffee powder and water for quick extraction. To this end, the filter part 630 can provide a dual structure including the first filter 631 and the second filter 632. When the first filter 631 and the second filter 632 rotate, the second filter 632 can serve as the stirrer due to the mesh size thereof so that it is guaranteed that coffee powder and water can be sufficiently stirred.

FIGS. 3A-D are diagrams illustrating shapes of a water surface expected when the first filter 631 and the second filter 632 rotate and force applied to coffee powder.

The second filter including a plurality of water turbine type filters (i.e., a plurality of filter blades 6323) can be located inside a cylindrical filter (i.e., the first filter 631). When coffee powder dropped from the grinder 200 is accumulated in the first filter 631, the controller can supply water to the receiving space 6116 using the water supplier 400 up to a water level at which the first filter 631 is almost submerged.

After supplying water, the controller rotates the driving motor 653 to transfer rotational force to the driving unit 650, so that the driving unit 650 can rotate the filter part 630. Rotation of the first filter 631 and the second filter 632 can rotate water and/or coffee liquid in the receiving space 6116. For example, the second filter 632 can quickly stir coffee powder and water.

The second filter 632 can divide the first filter 631 into a plurality of spaces by the plurality of filter blades 6323. When the second filter 632 rotates, coffee powder can move to an outer side in a radial direction (i.e., to an inner circumferential surface of the second filter 632) in the plurality of divided spaces. This is because the coffee powder receives centrifugal force due to forced flow of water by the second filter 632. In some implementations, the coffee powder can also be rotated by the filter blades 6323 that rotate water and the coffee powder can be further accumulated on the filter blades 6323 due to inertia.

A process until the filter part 630 rotates to reach a first rotational speed of a steady state from a stopping state is as follows. In the stopping state prior to the first rotational speed, coffee powder can be stirred while moving freely due to the size of the second mesh when the second filter 632 rotates. In some implementations, prior to the first rotational speed, centrifugal force can be applied to coffee powder, thereby performing quick extraction. For example, coffee liquid can be extracted by stirring at the beginning of rotation and centrifugal force can act on coffee powder accumulated on an inner circumferential surface of the first filter 631 after rotation occurs to some extent. As a result, coffee ingredients can be rapidly extracted using the stirring and centrifugal force.

For example, when rotation is started in the stopping state, speeds of the first filter 631 and the second filter 632 can be fast, while a rotational speed of water flow can be slow. This is because it takes time to rotate the water flow due to friction. In some implementations, since coffee powder is stirred by the second filter 632, the coffee powder can move faster than the speed of water flow.

In the steady state, both the first filter 631 and the second filter 632 can rotate at the first rotational speed and a fluid (including supplied water and/or coffee liquid) around the filter part 630 can also rotate at a speed similar to the first rotational speed, so that only centrifugal force caused by rotation rather than stirring may act. Therefore, an extraction speed of coffee ingredients can become slower than a state before the steady state.

To compensate for this phenomenon, the controller can rapidly stir coffee powder and water by rotating the filter part 630 in a direction opposite to a first rotation direction after the filter part 630 reaches the first rotational speed in the first rotational direction. In some implementations, the controller can enable quick extraction by repeating rotation in a second rotation direction after the filter part 630 reaches the first rotation speed in the first rotation direction.

FIG. 3A illustrates initial rotation of the filter part 630. Since a rotational speed of the filter part 630 is not very fast, a rotational speed of water may not be fast due to the size of the second mesh 6325. Accordingly, the surface of water inside the receiver 610 may have a weak wave shape and can be maintained almost constant. Coffee powder can also be accumulated in the center of the first filter 631 in a similar manner to a state that is accumulated by being dropped from the grinder 200 in an initial stage. FIG. 3C illustrates that there are significant differences between the rotational speed of the filter part 630 and the rotational speed of water at the beginning of rotation. A dotted arrow indicates a rotational direction and the magnitude of a relative rotational speed of the fluid (including supplied water and/or coffee liquid). A solid arrow indicates a rotational direction and the magnitude of a relative rotational speed of coffee powder. If the solid arrow is larger than the dotted arrow, stirring is actively performed.

FIG. 3B illustrates the case in which the filter part 630 rotates to reach the first rotational speed of the steady state. The surface of the fluid (including supplied water and/or coffee liquid) can form a curved surface, for example, a parabolic surface, by the rotational speed of the filter part 630. FIG. 3D illustrates the rotational speed of the fluid (including supplied water and/or coffee liquid), the rotational speed of the coffee powder, and a direction of centrifugal force applied to the coffee powder, in the steady state. Since the rotational speed of the fluid (including supplied water and/or coffee liquid) and the rotational speed of the coffee powder are similar, extraction by centrifugal force rather than by stirring is performed more actively. For example, the direction of the applied centrifugal force can be a direction of a thick arrow.

FIG. 4A is a diagram illustrating an example in which a filter part 630, a sealing part 670, and a discharger 680 are coupled. FIG. 4B is a diagram illustrating an exemplary sealing part 670. FIG. 4C is a diagram illustrating an exemplary discharger 680.

As described above, after the filter part 630 rotates in a first rotational direction to reach the rotational speed of the steady state, the rotational speed of the fluid (including supplied water and/or coffee liquid) and the rotational speed of the coffee powder can be similar, so that extraction can be performed by pressure that is caused by centrifugal force. Therefore, extraction efficiency may be reduced relative to a state prior to the steady state. In order to increase the extraction efficiency again, the controller can rotate the filter part 630 in a second rotational direction opposite to the first rotational direction, that is, reversely rotate the filter part 630.

Intermittent reverse rotation can help to extract coffee liquid by activating stirring again. The number of rotations, a rotational speed, and a duration in the second rotational direction can be controlled by a preset control method according to a temperature of water, an amount of water, a type of whole beans, or an amount of whole beans.

FIG. 4A illustrates the filter coupler 6319 rotatably coupled in a first rotation direction and a second rotation direction and the filter rotating shaft 6512b. The sealing part 670 and the discharger 680 can be coupled so as not to rotate at the same speed according to rotation of the filter coupler 6319. Accordingly, the discharger 680 can rotate as the filter part 630 rotates, so that a direction of a discharge passage may not change.

This coupling is possible because the sealing part 670 can include a screw protrusion 672 on an inner circumferential surface of the second through-hole 673 in the sealing part 670 as illustrated in FIG. 4B.

The sealing part 670 can have a cylindrical shape including the second through-hole 673. The sealing part 670 can include a cylindrical sealing body 671 and the second through-hole 673 defined in the sealing body 671 in the first direction. Therefore, a cross-section in a radial direction of the sealing body 671 can have a shape including a first coupling groove 674 coupled to the discharger 680 in a direction of the discharger 680, which is a shape of a body of rotation, for example, a donut shape, including the second through-hole 673 by rotating based on a separated center.

Figure 5B:
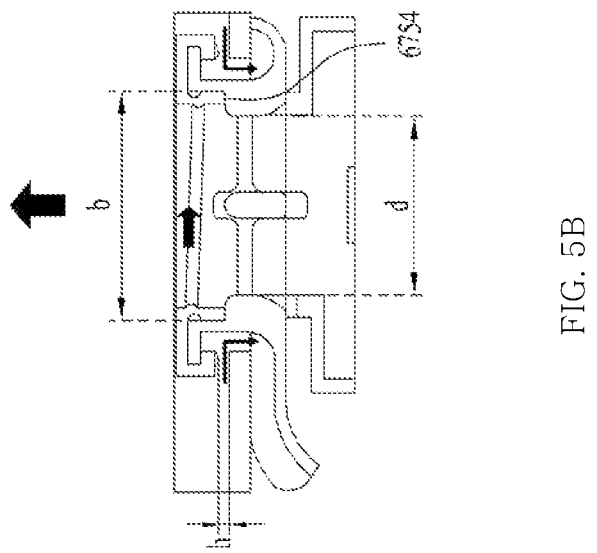
FIG. 5B is a diagram illustrating the sealing part and the discharger that are raised upward during rotation in a direction opposite to the first rotation direction to open the first through-hole.
Figure 5A:
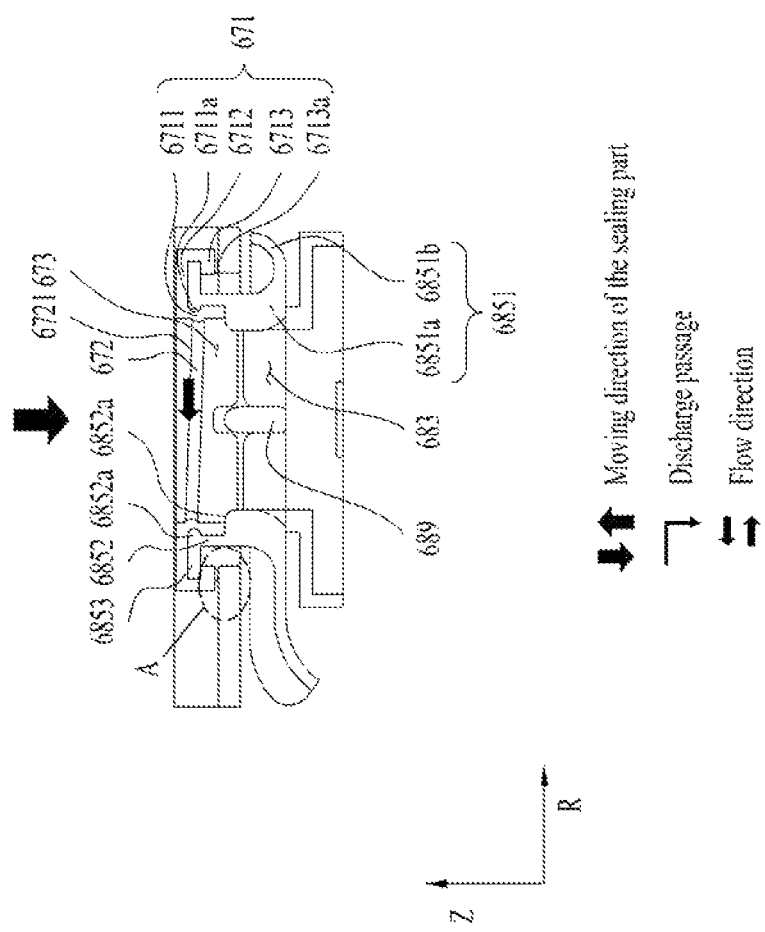
FIG. 5A is a diagram illustrating a sealing part and a discharger that are lowered downward during rotation in a first rotation direction to close a first through-hole.

Referring to FIG. 5A, the sealing body 671 can include a main body 6711 including the second through-hole 673, a first extension body 6712 extended in a radial direction of the sealing body 671 from an end located in a direction away from the discharger 680 among both ends of the main body 6711, and a second extension body 6713 angled from the first extension body 6712 and vertically extended towards the discharger 680. A circular first coupling groove 674 can be provided at an outer side of the main body 6711.

A main body groove 6711a coupled to the discharger 680 can be provided at an outer surface of the main body 6711 in the first coupling groove 674. A first discharger protrusion 6852a can be coupled to the main body groove 6711a. Thereby, when the discharger 680 is coupled to the first coupling groove 674, the discharger 680 can be fixed and the discharger 680 can also move when the sealing part 670 moves in the first direction.

The second extension body 6713 can include a sealing protrusion 6713a protruding towards the receiving body bottom surface 6114. The sealing protrusion 6713a can limit coffee liquid stored in the receiving space from leaking through the first through-hole 613 when the sealing protrusion 6713a contacts the receiving body bottom surface 6114. For example, the sealing protrusion 6713a can limit leakage through the sealing part 670 together with the screw protrusion 672.

FIG. 4C illustrates that the discharger 680 is coupled the sealing part 670 so that the second through-hole 673 and the third through-hole 683 can communicate with each other, and the filter rotating shaft 6512b can be inserted into the second through-hole 673 and the third through-hole 683. The filter rotating shaft 6512b can have a cross shape, which serves to well transfer rotational force when the filter rotating shaft 6512b is coupled to the filter coupler 6319.

The discharger 680 can include a first discharge passage 681 in which both ends of a U-shaped channel are combined to form a circular shape in order to receive coffee liquid discharged through the first through-hole 613, and a second discharge passage 682 of a U-shape coupled to the first discharge passage 681, for guiding coffee liquid to the coffee server 800. Accordingly, the third through-hole 683 can be defined by the first discharge passage 681.

The first discharge passage 681 can be inclined in a direction of the second discharge passage 682 so that coffee liquid discharged from the first extractor 600 can be guided to the second discharge passage 682.

Referring to FIG. 5A, the height of the U-shape of the second discharge passage 682 can be shorter than the height of the U-shape of the first discharge passage 681. Referring to a cross-section of the first discharge passage 681, the height of a first wall 6851a, which is a wall close to the third through-hole 683, can be taller than the height of a second inner wall 6851b, which is a wall far from the third through-hole 683. This can limit discharged coffee liquid from splashing onto the driving unit 650.

Referring to FIG. 5A, the first discharge passage 681 can further include a first extension wall 6852 extending from the first wall 6851a and a second extension wall 6853 angled outward in a radial direction from the first extension wall 6852. The thickness of the first extension wall 6852 can be thinner than the thickness of the first wall 6851a, so that the third through-hole 683 can be provided with a stopper 6754 having a bump shape formed on an inner circumferential surface due to a difference in thickness between the first extension wall 6852 and the first wall 6851a. When the sealing part 670 and the discharger 680 are coupled, the main body 6711 can be inserted into the third through-hole 683 and then can be mounted on the stopper 6754. Therefore, the stopper 6754 can serve to limit further insertion by force when the discharger 680 and the sealing part 670 are coupled. When the discharger and the sealing part are coupled, the second extension wall 6853 can be inserted into the first coupling groove 674.

A first discharger protrusion 6852a protruding in a direction opposite to the second extension wall 6853 can be provided at a position at which the second extension wall 6853 is angled from the first extension wall 6852. The first discharger protrusion 6852a can be coupled to the main body groove 6711a to increase coupling force between the sealing part 670 and the discharger 680, so that the discharger 680 can also move when the sealing part 670 moves in the first direction.

The second extension wall 6853 can be coupled to a groove formed on the second extension body 6713, so that leakage is limited by further increasing coupling force between the sealing part 670 and the discharger 680, and can cause the discharger 680 to move when the sealing part 670 moves in the first direction.

The discharger 680 can include a second discharger protrusion 689 having a protruding shape on an inner circumferential surface of the third through-hole. The height of the second discharger protrusion 689 can be similar to the height of the first wall 6851a. For example, the height from the bottom surface to the first extension wall 6852 can be taller than the height of the second discharger protrusion 689 from the bottom surface.

A second coupling groove 6714 corresponding to the second discharger protrusion 689 can be provided at a lower portion of the main body 6711. When the sealing part 670 is coupled to the discharger 680, the main body 6711 can be inserted into the third through-hole 683 up to the position of the stopper 6854. For example, the second coupling groove 6714 and the second discharger protrusion 689 can be coupled. If the discharger 680 is fixed through coupling of the second coupling groove 6714 and the second discharger protrusion 689, when the sealing part 670 rotates, rotation of the sealing part 670 can be limited. If the discharger 680 is not fixed, when the sealing part 670 rotates, the discharger 680 can rotate together with the sealing part 670.

As illustrated in FIG. 4A, the filter part 630 can be rotatable in a first rotation direction, for example, a counterclockwise (CCW) direction, or in a second rotation direction opposite to the first rotation direction, for example, a clockwise (CW) direction. For example, the sealing part 670 and the discharger 680 can rotate in the same direction according to rotation of the filter coupler 6319 but can be coupled so as not to rotate at the same speed. By way of further example, the sealing part 670 and the discharger 680 can rotate to open and close the first through-hole 613. The sealing part 670 and the discharger 680 may not rotate directly by rotation of the filter part 630 and rotate by rotation of a fluid (including supplied water and/or coffee liquid) stored in the receiving space 6116 according to rotation of the filter part 630. Accordingly, the discharger 680 can rotate together as the filter part 630 rotates, so that a direction of a discharge passage may not change rapidly.

In addition, when the sealing part 670 and the discharger 680 rotate, the sealing part 670 and the discharger 680 can rotate to a degree sufficient to open and close the first through-hole 613.

Referring to FIGS. 5A and 5B, the sealing part 670 and the discharger 680 can move to open and close the first through-hole 613 according to rotation in a first rotation direction or a second rotation direction. When the first through-hole 613 is opened by the sealing part 670, extracted coffee liquid can be discharged to the discharger. When the first through-hole 613 is closed by the sealing part 670, the extracted coffee liquid can be stored in the receiving space 6116 and may not be discharged.

When the filter part 630 rotates, the fluid (including supplied water and/or coffee liquid) stored in the receiving space 6116 can also rotate. For example, flow can occur in the fluid due to friction caused by rotation of the first filter 631 and rotational stirring of the second filter 632. If the filter part 630 continues to rotate in the first rotation direction or in the second rotation direction, the flow in the fluid can also correspondingly rotate in the first rotation direction or in the second rotation direction.

When the filter part 630 rotates, the filter coupler 6319 located under the filter part 630 can rotate at the same speed with the filter part 630. In some implementations, the sealing part 670 contacting the filter coupler 6319 in the second through-hole 673 can contact the filter coupler 61319 to limit leakage through the second through-hole but cannot rotate at the same speed as the filter part 630.

The filter coupler 6319 and the filter rotating shaft 6512b can be rotatably coupled in the first rotation direction and in the second rotation direction. The sealing part 670 and the discharger 680 can be coupled so as not to rotate at the same speed according to rotation of the filter coupler 6319. Therefore, the discharger 680 cannot rotate at the same speed as the filter part 630 according to rotation of the filter part 630.

However, in order to discharge the coffee liquid stored in the receiving space 6161 to the outside by opening or closing the sealing part 670, the coffee liquid should be discharged through the discharger 680 by opening the sealing part 670 when necessary. To this end, a separate drive source for opening and closing the sealing part 670 may be provided.

However, in some implementations, the sealing part 670 can move in the first direction without a separate driving source. For example, the sealing part 670 can move in an up and down direction to open and close the first through-hole 613. When the sealing part 670 moves in a direction away from the receiving body bottom surface 6114, a gap can be generated between the sealing part 670 and the receiving body bottom surface 6114 and the coffee liquid can be discharged through the first through-hole 613.

In some implementations, when the sealing part 670 is in contact with the receiving body bottom surface 6114, since there is no gap between the sealing part 670 and the receiving body bottom surface 6114, leakage through the first through-hole 613 can be limited.

To this end, the sealing part 670 can include the screw protrusion 672 in the form of a thread along an inner circumferential surface of the second through-hole 673. Accordingly, the filter coupler 6319 may not contact all of the inner circumferential surface of the second through-hole 673 and can contact the screw protrusion 672. This can cause the filter part 630 to limit leakage through the second through-hole 673 and facilitate rotation of the filter part 630. The screw protrusion 672 can be provided to be inclined along the inner circumferential surface of the second through-hole 673.

The screw protrusion 672 can enable the sealing part 670 to be opened or closed. For example, when the filter part 630 rotates, the fluid (including supplied water and/or coffee liquid) in the receiving space can rotate together without a separate driving source. Rotational force of the fluid can be applied to the screw protrusion 672 so that the sealing part 670 can move up and down.

When the first filter 631 and the second filter 632 rotate, water and/or coffee liquid received in the receiver 610 can flow in the same direction as rotation of the first filter 631 and the second filter. This is because, a forced vortex can be generated from the water received in the receiver 610 according to rotation of the first filter 631 and the second filter 632. Although secondary flow may occur, an effect thereof may not be greater than the forced vortex of the first filter 631 and the second filter 632.

FIG. 5A illustrates the case in which the filter part 630 rotates in a first rotational direction, for example, in a counterclockwise (CCW) direction. The fluid (including supplied water and/or coffee liquid) received in the receiving space will also rotate in the first rotational direction by rotation of the filter part 630. In some implementations, momentum caused by rotational flow of the fluid can be transferred to the screw protrusion 672. Since the screw protrusion 672 is provided to be inclined as illustrated, when the momentum of the fluid is transferred along an inclined surface, force by the fluid can be decomposed into the first direction (Z direction) and the second direction (R direction). For example, force can be applied to the receiving body bottom surface 6114 in the first direction. Accordingly, the sealing part 670 can contact the receiving body bottom surface 6114 and can limit leakage through the first through-hole 613.

For example, when the fluid hits an inclined surface 6721 of the screw protrusion due to an inclined surface of the screw protrusion 672, the sealing part 670 can move towards the receiving body bottom surface 6114 using force applied to the screw protrusion 672 to press the receiving body bottom surface 6114. The second extension body 6713 can include the sealing protrusion 6713a protruding towards the receiving body bottom surface 6114. Referring to a dotted circular part A of FIG. 5A, when the sealing part 670 presses the receiving body bottom surface 6114, since the sealing protrusion 6713a presses the receiving body bottom surface 6114, contact of a smaller area can occur. Therefore, leakage through the receiving body bottom surface 6114 can be effectively limited and the first through-hole can be closed.

FIG. 5B illustrates the case in which the filter part 630 rotates in a second rotation direction, for example, in a clockwise direction (CW). The fluid (including supplied water and/or coffee liquid) received in the receiving space can also rotate in the second rotation direction by rotation of the filter part 630. In some implementations, momentum caused by rotational flow of the fluid can be transferred to the screw protrusion 672. Since the screw protrusion 672 is provided to be inclined as illustrated, when the momentum of the fluid is transferred along an inclined surface, force by the fluid can be decomposed into the first direction (Z direction) and the second direction (R direction). However, contrary to the case in which the fluid moves in the first rotation direction, force can be applied in a direction in which the sealing part 670 moves away from the receiving body bottom surface 6114. Accordingly, the sealing part 670 is lifted from the receiving body bottom surface 6114 and the first through-hole 613 can be opened.

The sealing part 670 can open the first through-hole 613, based on the rotational direction of the filter part 630.

The coffee liquid stored in the receiving space 6116 can be discharged to the outside through the discharger 680 when the sealing part 670 moves upward with respect to the receiving body bottom surface 6114. The coffee liquid can move to a gap between the receiving body bottom surface 6114 and the sealing protrusion 6713a and can exit through a gap defined between the first through-hole 613 and the main body 6711, so that the coffee liquid can be discharged towards the discharger 680. A discharge path of the coffee liquid is shown by arrows in FIG. 5B.

When the filter part 630 rotates in the first rotation direction and reaches a first rotational speed, the filter part 630 can rotate in the second rotation direction in order to further facilitate stirring. When the filter part 630 rotates in the second rotation direction for extraction, since the coffee liquid can be discharged, a rotation time in the second rotation direction can be kept shorter than a rotation time in the first rotation direction and can occur intermittently. For example, since rotation in the second rotation direction is sufficient when coffee powder and water are well stirred and stirring is performed during rotation in the first rotation direction after rotation in the second rotation direction, there is no need to maintain rotation in the second rotation direction for a long time.

If the filter part 630 rotates only in the first rotational direction so that sufficient extraction is performed, this discharging structure can be used to discharge coffee liquid by rotation in the second rotation direction for adjustment of extracted concentration and adjustment of the capacity of water in the receiver 610 during extraction of a large amount of coffee liquid, rather than for improvement of extraction efficiency. The discharging structure can also be used to discharge all of the coffee liquid after extraction is complete.

The coffee liquid discharged from the receiver 610 can be guided to the second discharge passage 682 through the first discharge passage 681. The second discharge passage 682 can guide the coffee liquid to a coffee server so that the extracted coffee liquid can be stored in the coffee server. The first discharge passage can be provided to be inclined downward towards the second discharge passage 682 for smooth flow of the coffee liquid.

As described above, since the sealing part 670 and the discharger 680 are coupled to each other, the sealing part 670 and the discharger 680 can move together when the sealing part 670 moves in the first direction. Accordingly, when the sealing part 670 moves towards the receiving body bottom surface 6114, the discharger 680 can move in a direction away from the receiving body bottom surface 6114. If the sealing protrusion 6713a presses the receiving body bottom surface 6114, the sealing part 670 can stop moving and thus the discharger 680 can also stop moving.

In some implementations, when the sealing part 670 moves in a direction away from the receiving body bottom surface 6114, the discharger 680 can move towards the receiving body bottom surface 6114. This is because when the sealing part 670 and the discharger 680 are inserted into and coupled to the first through-hole 613, the sealing part 670 and the discharger 680 can be located in opposite directions with the receiving body bottom surface 6114 interposed therebetween.

When the sealing part 670 moves in a direction away from the receiving body bottom surface 6114 in the first direction, if the first discharge passage 681 contacts the receiving body bottom surface 6114, the sealing part 670 and the discharger 680 can stop moving.

As illustrated in FIG. 5B, a height at which the sealing part 670 is lifted from the receiving body bottom surface 6114 can indicated by h. A diameter b of an outer circumferential surface of the main body 6711 can be similar to a diameter of an inner circumferential surface of the first extension wall 6852. However, the diameter b of the outer circumferential surface of the main body 6711 can be longer than a diameter d of an inner circumferential surface of the first wall 6851a. Accordingly, when the main body 6711 is inserted through the third through-hole 683, the main body 6711 can be inserted into and coupled to a stopper 6754.

For example, if the sealing part 670 is made of an elastic rubber material, when the sealing part 670 is coupled to the discharger 680, the sealing part 670 can be coupled to the discharger 680 by tight fit.

As described in the foregoing description, the coffee extraction apparatus can apply pressure caused by stirring and pressure caused by centrifugal force using a filter of a water turbine type when coffee powder and water are mixed to enable quick coffee extraction using a cold brew method.

The coffee extraction apparatus can extract coffee liquid according to a rotation direction without a separate driving unit.

The coffee extraction apparatus can adjust the amount of water which is stirred and the concentration of coffee extraction by discharging coffee liquid to the outside according to a rotation direction.

The coffee extraction apparatus can interchangeably use extractors according to a hot brew method and a cold brew method.

The coffee extraction apparatus can substantially increase user convenience.

What is claimed is:

1. A coffee extraction apparatus, comprising:
   a grinder that is configured to grind whole beans into coffee powder having a preset size or less and that is configured to discharge the coffee powder;
   a grinder inlet defined at a first side of the grinder to introduce the whole beans to the grinder;
   a grinder outlet that is defined at a second side of the grinder opposite to the first side of the grinder and that is configured to discharge the coffee powder;
   a first extractor including:
      a receiver inlet that faces the grinder and that is configured to receive the discharged coffee powder,
      a filter part that is configured to receive the coffee powder through the receiver inlet and that is configured to extract coffee liquid by rotating the coffee powder with water of a first temperature, the first temperature being equal to or lower than 25 degrees Celsius, and a receiver that is configured to receive the water of the first temperature and that is configured to store the water of the first temperature or the extracted coffee liquid;
a driver that is coupled to the filter part and that is configured to rotate the filter part about a rotation axis that is parallel to a direction in which the water of the first temperature passes through the filter part;
a supporter that is disposed outside the grinder and the first extractor and that supports the grinder and the first extractor; and
a water supplier configured to supply the water of the first temperature to the first extractor through the receiver inlet,
wherein the receiver includes:
a receiving body that defines a space for receiving the coffee powder and the water,
a receiving body bottom surface that defines a bottom surface of the receiving body, and
a first through-hole having a circular shape and defined at the receiving body bottom surface,
a sealing part that is inserted into the first through-hole and that is configured to open and close the first through-hole,
a second through-hole defined in the sealing part in a first direction corresponding to a height direction of the receiver, and
a discharger that is coupled to a bottom surface of the sealing part and that is configured to guide the coffee liquid discharged through the first through-hole, and
wherein the sealing part is configured to move in the first direction based on the rotation of the filter part to open and close the first through-hole.

2. The coffee extraction apparatus of claim 1, further comprising:
a second extractor that faces the grinder outlet and that is configured to receive the coffee powder and water of a second temperature that is higher than the first temperature,
wherein the water supplier is configured to supply the water of the second temperature to the second extractor, and
wherein one of the first extractor or the second extractor is interchangeably coupled to the supporter.

3. The coffee extraction apparatus of claim 1, wherein the first extractor further includes a support arm supporting the receiver and the driver by coupling the receiver to the supporter.

4. The coffee extraction apparatus of claim 3, wherein the filter part includes:
a first filter detachably coupled to the driver; and
a second filter detachably coupled to an inner portion of the first filter and configured to rotate with the first filter.

5. The coffee extraction apparatus of claim 1, further comprising:
a driving motor disposed inside the supporter,
wherein the driver includes:
a first pulley configured to rotate based on rotation of the driving motor;
a second pulley configured to rotate the filter part; and
a belt that connects the first pulley to the second pulley and that is configured to transfer rotational force of the driving motor to the first pulley and the second pulley.

6. The coffee extraction apparatus of claim 5, wherein the second pulley includes:

a belt connector that is in contact with the belt and that is configured to rotate with the belt; and
a filter rotating shaft that is disposed at an upper portion of the belt connector, that is configured to rotate with the belt connector, that is inserted into the receiving body through the first through-hole, and that is detachably coupled to the filter part.

7. The coffee extraction apparatus of claim 6, wherein the sealing part includes a sealing body, the sealing body including:
a main body including a sealing body inner circumferential surface that defines the second through-hole, a screw protrusion provided on the sealing body inner circumferential surface, and a sealing body outer circumferential surface located in a direction away from the second through-hole;
a first extension body extended outwards, from an end of the sealing body, in a second direction corresponding to a radial direction of the sealing body;
a second extension body that is angled from the first extension body and that extends towards the receiving body bottom surface in the first direction;
a first coupling groove defined by the first extension body, the second extension body, and an outer circumferential surface of the main body; and
a sealing protrusion having a circular shape and protruding downward from the second extension body,
wherein the sealing protrusion is configured to move in the first direction during rotation of the filter part to open and close the sealing part.

8. The coffee extraction apparatus of claim 7, wherein the filter part includes:
a first filter detachably coupled to the driver;
a second filter that is detachably coupled to an inner portion of the first filter and that is configured to rotate with the first filter; and
a filter coupler that is disposed at a lower portion of the first filter and that is detachably coupled to the filter rotating shaft,
wherein the filter coupler is inserted into the second through-hole and contacts the screw protrusion.

9. The coffee extraction apparatus of claim 8, wherein, based on the first filter rotating in a first rotational direction, (i) the water or the coffee liquid received in the receiver rotates in the first rotational direction and (ii) the screw protrusion is configured to rotate in the first rotational direction, and
wherein the sealing part is configured to move downward based on the screw protrusion rotating in the first rotational direction, and
wherein the sealing protrusion and the receiving body bottom surface are configured to contact each other.

10. The coffee extraction apparatus of claim 9, wherein the screw protrusion is configured to, based on the filter part rotating in a second rotational direction corresponding to a direction opposite to the first rotational direction, rotate in the second rotational direction, and
wherein, based on the screw protrusion rotating in the second rotational direction, (i) the sealing part is configured to move upward and (ii) the sealing protrusion and the receiving body bottom surface are configured to be separated to open the first through-hole.

11. The coffee extraction apparatus of claim 7, further comprising:
a coffee server configured to receive the extracted coffee liquid,
wherein the discharger includes:

a first discharge passage defined at a lower portion of the receiver and including a first wall that has a circular shape and that defines a third through-hole and a channel having one opened surface; and a second discharge passage coupled to the first discharge passage and configured to guide coffee liquid flowing along the first discharge passage to the coffee server.

12. The coffee extraction apparatus of claim 11, wherein the discharger further includes:

a first extension wall extending from the first wall; and a second extension wall angled from the first extension wall, wherein the discharger is configured to, based on the second extension wall being coupled to the first coupling groove and the sealing part moving in the first direction, move with the sealing part.

13. The coffee extraction apparatus of claim 1, wherein the filter part includes:

a first filter detachably coupled to the driver; and a second filter detachably coupled to an inner portion of the first filter and configured to rotate with the first filter.

14. The coffee extraction apparatus of claim 13, wherein the first filter includes a first filter body that has a cylindrical shape and that includes a first opening at an upper portion to define a space for receiving the coffee powder, wherein the first filter body includes a first mesh defining an outer circumferential surface and a bottom surface of the first filter body, and wherein the first mesh has a size capable of passing only the water of the first temperature and coffee liquid.

15. The coffee extraction apparatus of claim 14, wherein the second filter includes:

a plurality of filter blades each including a second filter body; and a second filter upper body that is coupled to an upper portion of the second filter body, that is detachably coupled to the first filter, and that defines a second opening providing communication to the first opening, and wherein a diameter of the second opening is shorter than a diameter of the first opening.

16. The coffee extraction apparatus of claim 15, wherein each of the plurality of filter blades includes a second mesh, and wherein the second mesh has a size capable of passing the coffee powder.

17. The coffee extraction apparatus of claim 16, wherein each of the plurality of filter blades further includes a first frame inclined downward in a center direction of the first filter from an inner circumferential surface of the second opening, and wherein a space of an inverted conical shape is provided below the second opening based on rotation of the second filter.

18. The coffee extraction apparatus of claim 17, wherein the water received in the receiver flows in a rotational direction of the first filter and the second filter based on rotation of the first filter and the second filter.

* * * * *